Aug. 7, 1934.   B. H. SHINN   1,969,430
REFUELING EQUIPMENT
Original Filed Dec. 23, 1929    3 Sheets-Sheet 3
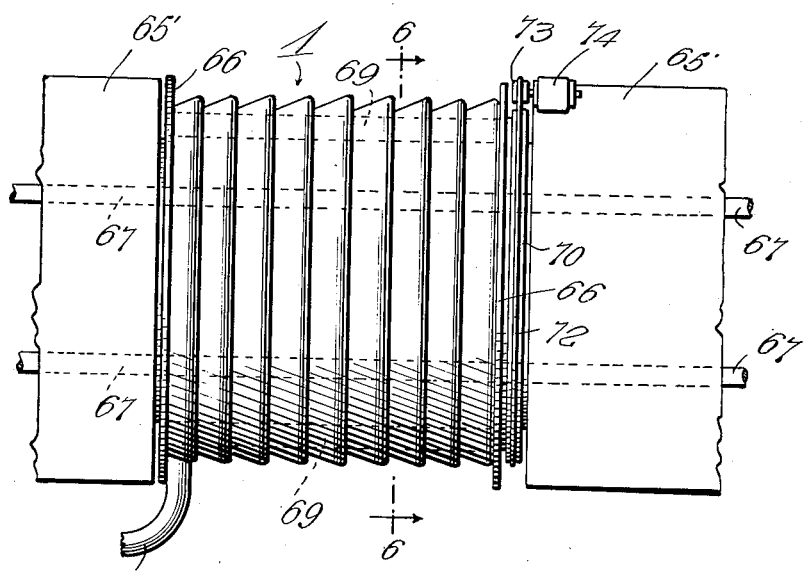
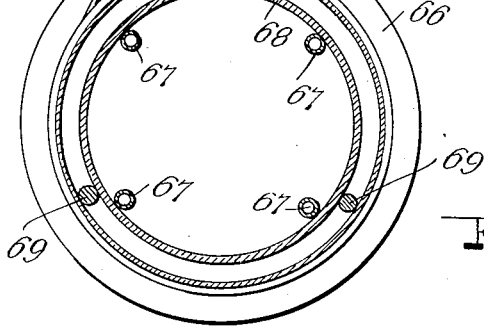
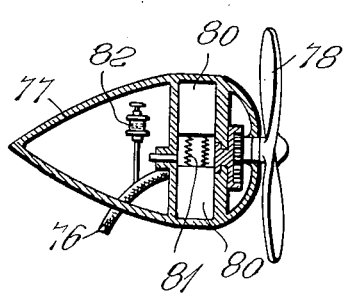
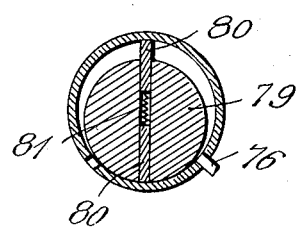
INVENTOR.
Byron H. Shinn,
BY
Fisher Pedersen, ATTORNEYS.

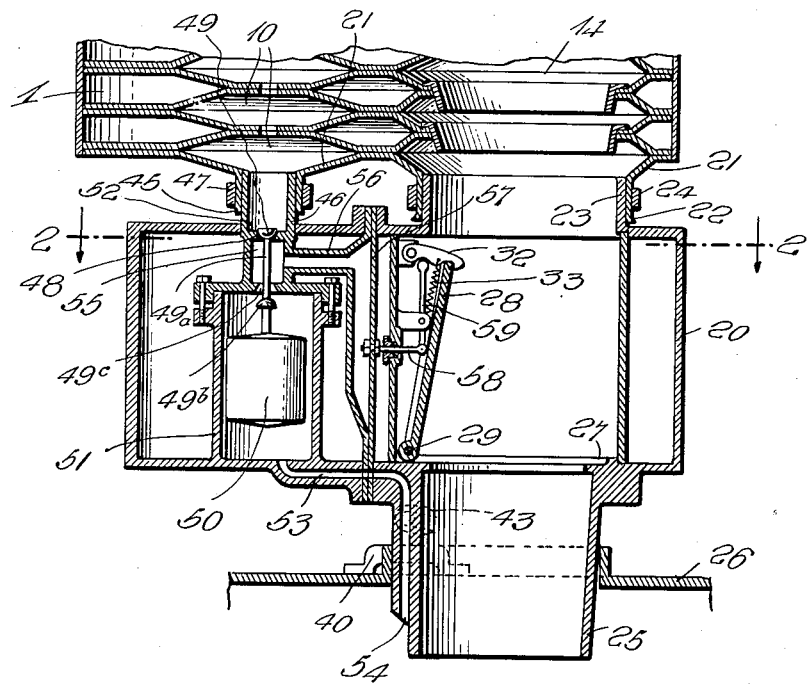

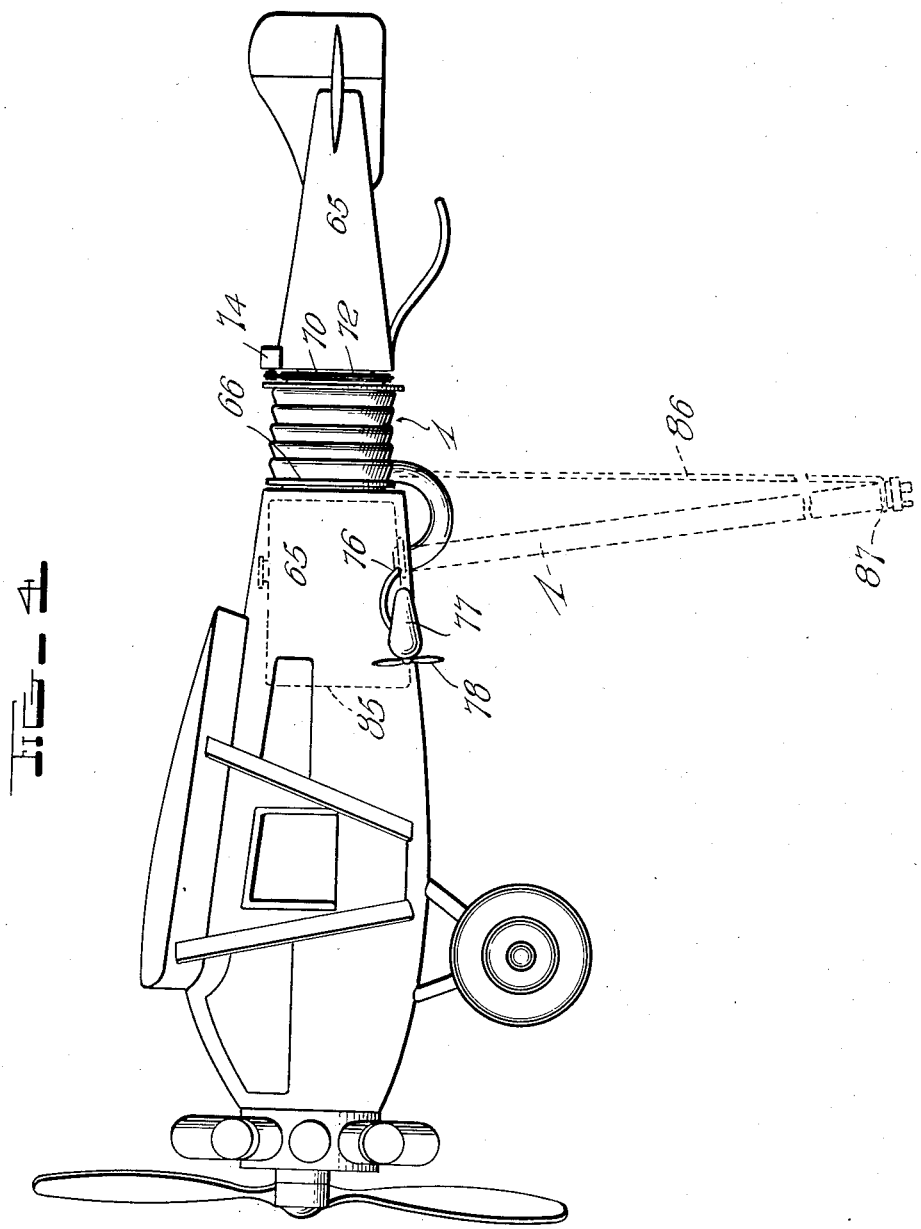

Patented Aug. 7, 1934

1,969,430

UNITED STATES PATENT OFFICE 1,969,430

REFUELING EQUIPMENT

Byron H. Shinn, Washington, Pa., assignor to Shinn Devices Corporation, Washington, Pa., a corporation of Delaware Original application December 23, 1929, Serial No. 416,144. Divided and this application July 11, 1932, Serial No. 621,998

14 Claims. (Cl. 244—1)

This invention is in refueling equipment for aircraft in flight, and is a division of my application serially numbered 416,144, filed December 23, 1929, which has matured into Patent Number 1,866,942. For convenience, it will be described in connection with the refueling of one airplane by another, but the invention is, of course, applicable to lighter-than-air craft, as well as heavier-than-air craft.

The invention comprises a number of features in refueling equipment which may be conveniently considered under three heads;

A. The extensible conduit or refueling pipe.

B. The valve mechanism and securing devices carried by the lower end of the pipe or conduit.

C. The reel and associated mechanism carried by the mother ship, on which reel the pipe is wound.

The liquid carrying pipe or conduit of this invention is made extensible, so that if after contact has been made between the two ships, one draws away from the other, contact will not be broken, but will be maintained by the stretching of the pipe. In its preferred form, the pipe is made up of a number of interconnected bellows sections, so that if a stretching force is exerted on the pipe it will very readily elongate and so accommodate itself to this stretching force.

In order to decrease wind resistance, the refueling pipe is made streamlined, and in order further to lessen air resistance, there is provided an enveloping membrane. This enveloping membrane is also elastic so that it stretches as the pipe elongates.

A possible difficulty to be reckoned with in a pipe which stretches or elongates is that the wind pressure, which at the speeds at which airplanes fly is very considerable, would tend to bend back the pipe to its full length, which is undesirable because it would lengthen the time of the refueling operation and because the pipe might become entangled with the tail surfaces of either of the planes. A spring might be used to counteract this tendency of the pipe to bow back, but a probable difficulty with a spring is that on account of the fact that the elongation is proportional to the force applied, if the pipe were stretched to say twice its length the force exerted by the spring would be so great that forces difficult to handle would be encountered, which would cause the pipe to snap back upon release by the receiving ship, etc.

In order to counteract the wind pressure, there is provided in the rear part of the conduit a series of interconnected chambers which are subjected to suction or a partial vacuum, which tends to draw them together, which in turn tends to make the pipe bow into the wind, and so tends to counteract the force of the wind tending to make the pipe bow the other way.

The liquid carrying pipe or conduit, as above outlined, is described in detail and claimed in my Patent 1,866,942 above referred to. The present application has to do more particularly with the valve mechanism and securing devices carried by the lower end of the pipe or conduit, and the reel and associated mechanism carried by the mother ship, on which reel the pipe is wound.

The valve mechanism at the lower end of the conduit comprises a valve which is opened manually, and which if released by the operator will immediately and automatically close. Associated with the valve housing are latch or hook means for securing the valve in place on the receiving ship. This latch or hook mechanism is controlled by the same handle which controls the valve, being arranged so that if the handle is released, the valve will be closed as above mentioned, and at the same time the latch or hook mechanism automatically disconnected.

Automatic means are also provided for closing the valve when the liquid in the receiving reservoir has reached a predetermined level. This is accomplished through the suction or vacuum part of the conduit. To this end, there is provided a liquid passage from the lower end of the valve housing into a float chamber. When the liquid in the receiving reservoir has nearly filled it, liquid is sucked up this passage and lifts the float which causes a diaphragm to be subjected to the vacuum or low pressure in the conduit, the diaphragm tripping a latch which releases the valve and allows it to close automatically.

The reel carried by the mother ship comprises a drum which is mounted exteriorly of the fuselage to rotate on an axis extending fore and aft of the fuselage, the drum being mounted substantially concentrically of the fuselage. The drum is arranged to encircle the longerons of the fuselage.

A vacuum or suction pump preferably wind driven, is carried by the mother ship and is adapted to be connected to the vacuum chambers in the conduit.

The main features of the invention having been thus outlined, these several features will now be described in more detail, reference being made to the accompanying drawings, illustrating the present preferred embodiment of the invention. It should, however, be understood that the invention is not to be limited to the specific details illustrated, but the inventive thought may be carried out in other ways.

In the drawings:

Fig. 1 is a sectional view through the valve housing and associated mechanism on the end of the pipe;

Fig. 2 is a section on the line 9—9 of Fig. 1;

Fig. 3 shows a detail of the receiving reservoir;

Fig. 4 shows the reel on the mother ship;

Fig. 5 is an enlarged view showing the mounting of the reel;

Fig. 6 is a section on the line 13—13 of Fig. 5;

Figs. 7 and 8 are side and cross sections of a wind driven vacuum pump.

Referring now to these drawings, in which similar reference characters indicate similar parts, there is carried at the lower end of the pipe or conduit 1, a housing member indicated generally at 20. The lowermost of the bellows elements 21 of the pipe 1 has a downward lip 22 which takes over a flange 23 on the housing being secured thereto by a collar 24. Leading from the housing 20 is a delivery pipe 25 designed to deliver fluid into the reservoir 26 on the receiving ship. The housing is provided with a valve seat 27 adapted to be closed by a valve 28 pivoted on the shaft 29 to move therewith. On one end of the shaft 29 there is secured a handle 30 by which the shaft 29 may be rotated. A pivoted latch 32 urged downwardly by spring 33 tends to hold the valve 28 in the open position. The valve is connected with its handle 30 so that if the handle is released by the operator, the valve will be closed automatically by flow of fluid. To this end the handle 30 is provided with a pivoted member 34, the outer end 35 of which engages with a rod 36 which slides in the shaft 29. The end of the rod 36 comes out of the shaft 36 through a slot 37 and is bent upwardly as at 38 so as to be in a position to engage the latch 32. If the operator should release the handle 30 a spring 39 would push the pivoted member 34 so as to cause the end 38 of the handle to disengage the latch 32 whereupon 28 would close.

Mounted on the reservoir 26 of the receiving ship is a pair of standards 40 provided with pintles 42. The shaft 29 already described is provided with a pair of hooks 43 fixed to rotate with the shaft, so that when the handle 30 is turned counterclockwise so as to open the valve 28, the hooks 43 will engage the pintles 42 for holding the housing member 20 in position to deliver the fluid to the reservoir 26. If the operator releases the handle, valve 28 is closed as already described, and at the same time the hooks 43 will be swung to the left, Fig. 1, and automatically disengaged from the pintles 42.

Mechanism for automatically releasing the valve when the reservoir 26 is substantially full will now be described.

The lowermost bellows member 21 is provided with a downwardly extending lip 45 which engages over a nipple 46 on the housing 20 being secured thereto by collar 47. The nipple 46 is provided with a valve seat 48 on which is seated a valve 49 connected by rod 49a with a float 50 moving in the float chamber 51. A valve 49b on rod 49a is adapted to seat against valve seat 49c in the top of the chamber 51. The valve seat 48 is provided with a small by-pass 52 which subjects the interior of the float chamber to a slight suction. The housing 20 is provided with means forming a passage 53 communicating with the float chamber 51 and having a lower opening 54 which would be located near the top of the receiving reservoir 26 when the apparatus is in fluid delivering position. When the reservoir has been filled to the level of the opening 54 the suction within the float chamber will draw up fluid into the float chamber which will cause the float to rise, close valve 49b and open valve 49, and create a strong suction in a chamber 55 just below the valve. The chamber 55 is connected through pipe 56 with one side of the diaphragm 57, to the center of which is connected a rod 58 pivoted to a pivoted trip member 59. When the float rises and subjects the chamber 55 to this strong suction, diaphragm 57 will be pulled to the left, moving the upper end of the trip member to the right, tripping the valve which will close, due to gravity and the downward rush of fluid.

The fuselage of the mother ship is indicated at 65. Toward the rear part of the fuselage there is mounted a winding drum or reel 66, mounted substantially concentrically with the fuselage, that is to say, the axis of the reel and the axis of the fuselage are substantially coincident. Encircling the longerons 67 of the fuselage there is a plurality of rings 68. Grooved or other suitable rollers 69 roll on these rings 68 and serve as a bearing and mounting for the reel 66, just outside these rollers.

The reel may be turned by hand, but power means is preferably provided for turning it; to this end there is provided a grooved wheel 70 of substantially the same diameter as the reel on which is mounted a driving cable 72 which engages over a pulley 73 mounted on the rotating armature of a motor 74 which is connected to be rotated in either direction by well known means, such as a rheostat and reversing switch.

The streamlined conduit 1 will lie on the reel substantially as shown in Figs. 4 and 5. The fuselage is provided with fairing, as at 65', for lessening wind resistance.

To provide suction for the vacuum chambers 10, a suction pipe 76 is connected at its suction end to the upper end of conduit 1; pipe 76 is connected to any suitable vacuum producing means such as a wind driven vacuum pump 77 driven by the propeller 78. The propeller is connected to turn the cylindrical member 79 which is centrally slotted; in the slots of 79 there is a pair of vanes 80 urged apart by a spring 81. Oil may be supplied to pipe 76, the inflowing air carrying the oil to the vanes. When 79 turns in a counterclockwise direction, Fig. 8, a suction is produced which is communicated to the chambers 10 of the conduit 1. An important aspect of this particular vacuum producing means is that the faster the mother ship is flying, the stronger the suction produced, and therefore the greater the bowing effect, which tends to counteract the wind pressure as described in my patent above referred to.

The upper end of the pipe is permanently coupled to the fuel reservoir 85 in the mother ship, and the uppermost of the vacuum chambers 10 is permanently coupled with the suction pipe 76. A pilot rope 86 is attached at its lower end to the lower end of the conduit, as at 87, while its upper end winds on the reel 66. In winding up the conduit, the reel is rotated, which first winds up the pilot rope, it in turn pulling up the conduit, which in turn is wound on the reel. As the conduit is wound up, any liquid remaining in the conduit will drain back into the reservoir 85, an upwardly opening check valve 87, Fig. 2, in valve 28 admitting air to relieve the suction effect which such drainage might cause.

While the invention has been described in some detail in its present preferred form, it should be understood that this disclosure is illustrative and not restrictive of the invention, and that it can be carried out in other ways, as falling within the scope of the claims.

I claim as my invention:

1. Refueling equipment for aircraft, comprising a conduit, a valve housing carried by the lower part of the conduit, a valve in said housing, means carried by the housing for temporarily attaching the housing to the reservoir of the plane being refueled, and a common manual means operatively connected to the valve and to said attaching means.

2. Refueling equipment for aircraft, comprising a conduit, a valve housing carried by the lower part of the conduit, a valve in said housing, means carried by the housing for temporarily attaching the housing to the reservoir of the plane being refueled, a common manual means operatively connected to the valve and to said attaching means, said manual means being connected so that when the handle is released, the valve is closed automatically and the attaching means disconnected.

3. Refueling equipment for aircraft, comprising a conduit, a valve housing carried by the lower part of the conduit, a valve in said housing, means carried by the housing for temporarily attaching the housing to the reservoir of the plane being refueled, the valve and the attaching means being connected to turn together about a common pivot, whereby closure of the valve will disconnect the attaching means.

4. Refueling equipment for aircraft, comprising a conduit having a liquid channel and a suction channel, a valve housing carried at the lower end of the conduit, a manually operated valve in the housing, and means, connected with and actuated by the suction in the suction channel, for causing the valve to close when the liquid level in the receiving reservoir has attained a predetermined level.

5. Refueling equipment for aircraft, comprising a conduit having a liquid channel and a suction channel, a valve housing carried at the lower end of the conduit, a manually operated valve in the housing, and means, connected with and actuated by the suction in the suction channel, for causing the valve to close when the liquid level in the receiving reservoir has attained a predetermined level, said means comprising a float which is lifted by liquid sucked up from the receiving reservoir.

6. Refueling equipment for aircraft, comprising in combination with an airplane fuselage, a reel for a conduit rotatably mounted substantially concentrically of the fuselage with its axis of rotation extending fore and aft, the diameter of the reel being about the same as the diameter of the fuselage at the point where it is mounted and the reeling surface being on the outside of the fuselage.

7. Refueling equipment for aircraft, comprising in combination with an airplane fuselage, a reel for a conduit rotatably mounted substantially concentrically of the fuselage with its axis of rotation extending fore and aft, the diameter of the reel being about the same as the diameter of the fuselage at the point where it is mounted, the reel encircling the longerons of the fuselage and the reeling surface being on the outside of the fuselage.

8. Refueling equipment for aircraft, comprising in combination with an airplane fuselage, a reel for a conduit rotatably mounted substantially concentrically of the fuselage with its axis of rotation extending fore and aft, the diameter of the reel being about the same as the diameter of the fuselage at the point where it is mounted, the reeling surface being on the outside of the fuselage and a motor for turning the reel.

9. Refueling equipment for aircraft, comprising a reel carried by a mother ship, a refueling conduit adapted to be wound on the reel, the pipe being provided with vacuum chambers, and a vacuum pump carried by the mother ship and adapted to be connected to the conduit.

10. Refueling equipment for aircraft, comprising a reel carried by a mother ship, a refueling conduit adapted to be wound on the reel, the pipe being provided with vacuum chambers, and a wind driven vacuum pump carried by the mother ship and adapted to be connected to the conduit.

11. Refueling equipment for aircraft, comprising in combination with a mother ship, a conduit having its upper end connected with a reservoid in the mother ship, a reel on the mother ship having its axis substantially concentric with the fuselage thereof, and a pilot rope connected to the lower end of the conduit and adapted to wind on said reel.

12. Refueling equipment for aircraft, comprising in combination with a mother ship, a fuel reservoir, a suction producing means, a conduit coupled at its upper end to the reservoir and the suction producing means, a reel on the mother ship, and a pilot rope connected to the lower end of the conduit and adapted to wind on said reel.

13. Refueling equipment for aircraft, comprising in combination a gas tank in a mother ship, a hose, the upper end of which is permanently connected to the said gas tank, a reel on the mother ship, and a rope attached to the lower end of the hose, and to the reel, for reeling up the hose from its lower end.

14. Refueling equipment for aircraft, comprising in combination a gas tank in a mother ship, a hose, the upper end of which is permanently connected to the said gas tank, a reel on the mother ship having its axis substantially coincident with the axis of the fuselage, and its reeling surface outside of the fuselage, and a rope attached to the lower end of the hose, and to the reel, for reeling up the hose from its lower end.

BYRON H. SHINN.